United States Patent
Chen et al.

(10) Patent No.: US 11,893,719 B2
(45) Date of Patent: Feb. 6, 2024

(54) SINGLE-SHOT DIFFERENTIAL PHASE CONTRAST QUANTITATIVE PHASE IMAGING METHOD BASED ON COLOR MULTIPLEXED ILLUMINATION

(71) Applicant: NANJING UNIVERSITY OF SCIENCE AND TECHNOLOGY, Jiangsu (CN)

(72) Inventors: Qian Chen, Nanjing (CN); Yao Fan, Nanjing (CN); Chao Zuo, Nanjing (CN); Jiasong Sun, Nanjing (CN); Xiangpeng Pan, Nanjing (CN); Shijie Feng, Nanjing (CN); Yuzhen Zhang, Nanjing (CN); Guohua Gu, Nanjing (CN); Jiaji Li, Nanjing (CN); Jialin Zhang, Nanjing (CN)

(73) Assignee: NANJING UNIVERSITY OF SCIENCE AND TECHNOLOGY, Nanjing (CN)

( * ) Notice: Subject to any disclaimer, the term of this patent is extended or adjusted under 35 U.S.C. 154(b) by 141 days.

(21) Appl. No.: 17/766,088

(22) PCT Filed: Aug. 18, 2020

(86) PCT No.: PCT/CN2020/109735
§ 371 (c)(1),
(2) Date: Apr. 1, 2022

(87) PCT Pub. No.: WO2021/073245
PCT Pub. Date: Apr. 22, 2021

(65) Prior Publication Data
US 2022/0366552 A1 Nov. 17, 2022

(30) Foreign Application Priority Data
Oct. 15, 2019 (CN) .......... 201910977145.X

(51) Int. Cl.
G06T 5/50 (2006.01)
G02B 21/36 (2006.01)

(52) U.S. Cl.
CPC .............. G06T 5/50 (2013.01); G02B 21/367 (2013.01)

(58) Field of Classification Search
CPC ............ G06T 5/50; G06T 2207/10101; G06T 2207/20056; G06T 5/10; G06T 5/007; G02B 21/367; G02B 21/14
See application file for complete search history.

(56) References Cited

U.S. PATENT DOCUMENTS 9,892,812 B2 * 2/2018 Zheng .................. G02B 27/58
9,983,397 B2 * 5/2018 Horstmeyer ....... G02B 21/0056
(Continued)

FOREIGN PATENT DOCUMENTS

CN 108537842 A 9/2018
CN 109375358 A 2/2019

OTHER PUBLICATIONS

Ding, "Design and Development of the Built-In Cell Dynamic 3D Microscopic Imaging System of the Incubator", Nanjing University of Science & Technology, 2018, pp. 18-28, Total 70 Pages.
(Continued)

Primary Examiner — Michael Lee
(74) Attorney, Agent, or Firm — Birch, Stewart, Kolasch & Birch, LLP

(57) ABSTRACT

A single-shot differential phase contrast quantitative phase imaging method based on color multiplexing illumination. A color multiplexing illumination solution is used to realize single-shot differential phase contrast quantitative phase imaging. In the single-shot color multiplexing illumination solution, three illumination wavelengths of red, green, and blue are used to simultaneously illuminate a sample, and the
(Continued)

information of the sample in multiple directions is converted into intensity information on different channels of a color image. By performing channel separation on this color image, the information about the sample at different spatial frequencies can be obtained. Such a color multiplexing illumination solution requires only one acquired image, thus enhancing the transfer response of the phase transfer function of single-shot differential phase contrast imaging in the entire frequency range, and achieving real-time dynamic quantitative phase imaging with a high contrast, a high resolution, and a high stability. In addition, an alternate illumination strategy is provided, so that a completely isotropic imaging resolution at the limit acquisition speed of the camera can be achieved.

6 Claims, 3 Drawing Sheets

(56) References Cited

U.S. PATENT DOCUMENTS

| | | | | |
|---|---|---|---|---|
| 9,998,658 B2* | 6/2018 | Ou | ........................ | G02B 27/58 |
| 11,468,557 B2* | 10/2022 | Ou | ........................ | G06T 7/0012 |
| 11,487,096 B2* | 11/2022 | Chen | .................... | G02B 21/365 |
| 11,555,992 B2* | 1/2023 | Chen | .................... | G02B 21/361 |
| 11,703,672 B2* | 7/2023 | Schumann | ........... | G02B 21/367 |
| | | | | 359/385 |
| 2016/0341945 A1* | 11/2016 | Ou | ........................ | H04N 23/56 |
| 2019/0107655 A1 | 4/2019 | Waller et al. | | |
| 2021/0191099 A1* | 6/2021 | Luo | ........................ | G02B 21/14 |

OTHER PUBLICATIONS

Fan et al. "Optimal Illumination Scheme for Isotropic Quantitative Differential Phase Contrast Microscopy" Photonics Research, Aug. 2019, vol. 7, No. 8, pp. 890-904.

International Search Report (PCT/ISA/210) issued in PCT/CN2020/109735 dated Nov. 24, 2020.

Lee et al., "Color-coded LED microscopy for multi-contrast and quantitative phase-gradient imaging", Biomedical Optics Express 2015, vol. 6, No. 12, pp. 4912-4922, Total 11 pages.

Tian et al., "Quantitative differential phase contrast imaging in an LED array microscope", Optics Express, 2015, vol. 23, No. 9, pp. 11394-11403.

* cited by examiner

SINGLE-SHOT DIFFERENTIAL PHASE CONTRAST QUANTITATIVE PHASE IMAGING METHOD BASED ON COLOR MULTIPLEXED ILLUMINATION

Technology Field

The present invention belongs to optical microscopic imaging, quantitative phase imaging technology, especially a single-shot differential phase contrast quantitative phase imaging method based on color multiplexed illumination.

Background Technology

Quantitative analysis of cellular 3D structures at the cellular and subcellular levels is essential in the fields of biology, biomedical and pathological research. However, biological cells present a very low contrast under conventional bright-field microscopy due to their weak absorption. In order to make cells visible under the microscope, existing means often employ staining or fluorescent labeling to improve the contrast of cells. However, such invasive means often have an adverse impact on cellular activity and may damage or even kill cells. Label-free imaging techniques solve this problem, such as phase contrast imaging (PC) and differential interference (DIC) imaging, which do not require any exogenous markers to treat the cells and allow for long-time imaging while maintaining cell activity. PC microscope enhances the imaging contrast by transforming the phase difference of light into an amplitude difference perceptible to the human eye through the annular diaphragm and phase plate, using the phenomenon of light interference. DIC microscope converts the phase difference of a sample into an observable intensity difference by interfering with the polarized light passing through the sample through a quartz Nomarski prism. Although both methods can be used to observe living cells and certain fine structures within cells, they provide only qualitative visualization results. Quantitative phase imaging (QPI) technology provides a valuable optical tool for living cells, which allows the quantitative study and analysis of optical thickness variations of living cells and tissues without labeling. In recent years, several QPI methods have been proposed by domestic and international researchers, such as transport-of-intensity equation (TIE), differential phase contrast (DPC), Fourier ptychographic imaging (FPI), etc. Among these methods, DPC QPI adopts the principle of incoherent imaging, which has higher imaging efficiency, reconstruction accuracy and stability, and has become one of the most promising methods for quantitative studies of living cells in vitro.

DPC uses one-step deconvolution to reconstruct the quantitative phase of the sample, and the imaging performance is often determined by the transfer function of the system. Once the system parameters have been determined (numerical aperture (NA) of the objective, illumination function), the transfer response of the phase transfer function (PTF) is directly determined by the illumination pattern. In conventional DPC imaging methods, the sample is usually illuminated with complementary semi-circular patterns in two orthogonal directions, and four images are acquired to achieve phase reconstruction (Tian L, Waller L. Quantitative DPC imaging in an LED array microscope. optics express, 2015, 23(9): 11394-11403; DPC microscopy imaging method based on semicircular LED illumination - CN201710660630.5). Compared with other QPI methods, this method requires only 4 images, which has a faster imaging speed. However, for some dynamic biological samples such as living cells, such multiple measurements reduce the temporal resolution of DPC. To improve the imaging efficiency of DPC imaging and make it possible to observe living cells, some researchers have used color-coded LEDs to encode four source patterns into two images (D. Lee, S. Ryu, U. Kim, D. Jung, and C. Joo, "Color-coded led microscopy for multi-contrast and quantitative phase-gradient imaging," Biomedical Optics Express 2015, 6, 4912-4922.). This method reduces the number of images acquired and improves the speed of imaging, but it does so at the expense of imaging quality. Compared with the conventional DPC method, the phase transfer response of this method is poor (especially in the low and high frequency components) due to the imperfect illumination design, and the obtained phase results have poor contrast and some high frequency information cannot be distinguished.

Invention content

This invention proposes a single-shot DPC QPI method based on color multiplexed illumination to solve the problems of slow imaging speed and serious loss of frequency information in DPC QPI, and realizing real-time dynamic high-resolution and high-stability DPC QPI. The technical solution to achieve single-shot DPC QPI method based on color multiplexed illumination is:

Step 1, image acquisition under color multiplexed illumination: a high-contrast LCD TFT-LCD or a high-density programmable LED array is controlled by a computer through a serial port to display color multiplexed illumination pattern illumination samples. The illumination pattern is an annular illumination with red, green, blue colors, their asymmetry axis difference of 120°. The NA of the annular illumination is equal to the NA of the objective, and the intensity of the illumination is distributed sinusoidally according to the asymmetry axis. The illumination control is sent at the same time to generate a synchronous trigger signal to the color camera to collect a color sample image, noted as $I_c$.

Step 2, image color channel separation and correction: the color sample images are separated by color channel and color leakage correction is performed to obtain the intensity images of the samples corresponding to the red, green and blue channels $I_{r,corr}$, $I_{g,corr}$, $I_{b,corr}$.

Step 3, DPC image spectrum generation: the Fourier transform is performed on the three grayscale images $I_{r,corr}$, $I_{g,corr}$, $I_{b,corr}$ to obtain the spectrums distribution of the three images. The values of zero frequency of the three spectrums are set to zero to eliminate the effect of the background term, and the DPC image spectrum $\widetilde{I_{r,corr}}$, $\widetilde{I_{g,corr}}$, $\widetilde{I_{b,corr}}$, of the sample is obtained.

Step 4, PTF calculation: Based on the weak phase approximation condition, the PTF $PTF_r(u)$, $PTF_g(u)$, $PTF_b(u)$ corresponding to different wavelengths is calculated according to the parameters of the illumination function and the objective lens.

Step 5, quantitative phase recovery: Based on $PTF_r(u)$, $PTF_g(u)$, $PTF_b(u)$ at different wavelengths and DPC image spectrum of the sample, the Tikhonov criterion is used for the inverse convolution calculation to obtain the high-resolution spectrum of the sample phase. The inverse Fourier transform is performed on this high-resolution spectrum to obtain the quantitative phase distribution of the sample.

Compared with the prior art, the significant advantages of the present invention are: (1) Rigorously deriving the isotropic PTF for three-axis DPC imaging, designing a three-axis optimal illumination pattern for DPC to achieve isotropic imaging, and improving the phase transfer response over the entire theoretical bandwidth of incoherent imaging. Compared with existing illumination schemes, the invention not only achieves isotropic imaging, but also significantly improves the phase contrast and imaging resolution. (2) Combining the color multiplexed illumination and the optimal triaxial illumination to achieve single-shot DPC imaging, which maximizes the imaging quality with real-time dynamic imaging efficiency, realizing real-time dynamic high-resolution and high-stability QPI. (3) An alternating illumination strategy is proposed to compensate for the missing frequency caused by the wavelength difference of the color multiplexed method and achieve fully isotropic imaging. (4) From the implementation means, the TFT-LCD modulated illumination source enables color multiplexed illumination by simply adding an LCD module to a conventional microscope, which is compatible with any microscope system. (5) From the imaging performance, the invention achieves the fastest imaging speed (single shot) and the best imaging quality at the same time.

The present invention is further described in detail below in conjunction with the figures.

Figures

Specific Implementation

The experimental platform of the present invention for DPC quantitative phase microscopy imaging method based on color multiplexed illumination can be built based on any commercial microscope system by simply adding a light source modulation module color LCD display illumination or programmable color LED array to the optical path. The schematic diagram of the microscope system is shown in FIG. 2(a), which includes a color multiplexed light source module (an assembly consisting of a mercury lamp, LCD, and a condenser), a sample, a microscope objective (achromatic objective), a tube lens, and a color camera. The color multiplexed light source module can adopt two structures. The first one is to use the microscope's own light source, LCD display and condenser lens as the illumination module, and the LCD is used to modulate the light source so that the light source irradiated on the sample is the color multiplexed pattern designed by the present invention. The second type uses LED as the illumination system, and it is directly controlled by the computer to display color multiplexed illumination pattern. Then, the colored light is concentrated on the sample after passing through the condenser lens. The LED array or LCD display includes a number of point light sources, they are regularly arranged to form a two-dimensional matrix. Each point source can be illuminated with three channels: red, green, and blue, with typical wavelengths of 632 nm for red, 522 nm for green, and 470 nm for blue. The typical value of center distance d between each point source is 1-10mm. The illumination module is positioned under the object stage and is typically spaced between 30-90mm from the upper surface of the object stage, with its central LED on the optical axis of the microscope.

If LED arrays are used for system illumination, the drive implementation circuit to light up each of the point sources can be implemented using (but not limited to) existing technologies such as microcontrollers, ARM, or programmable logic devices, and the specific implementation methods can be found in the references (Baozeng Guo, Chunmiao Deng: FPGA-based LED display control system design [J]. Liquid Crystal and Display, 2010, 25(3):424-428). If the LCD display is used for system illumination, the LCD is used to replace the aperture diaphragm under the condenser lens in the original microscope. The illumination pattern of the invention is used as a spatial light filter. The technology used in the driving circuit is basically the same as that of the LED array, and the specific implementation method can be found in the references (Lin, F., Zhang, W. W.: Rheinberg illumination microscopy principle and system based on programmable LCD. Design. Journal of Optics, 2016, 8:237-243).

Figure 1:
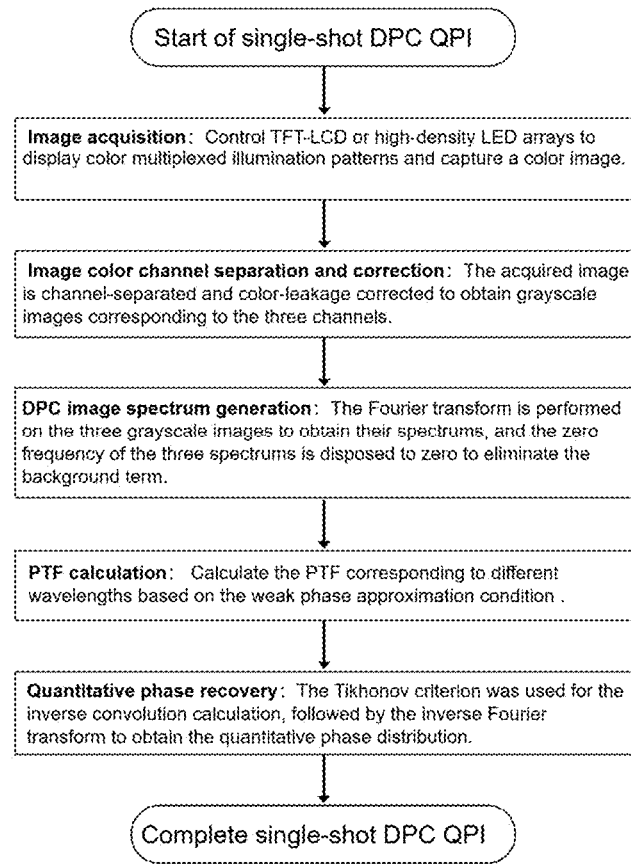
FIG. 1 is a flow chart of the invention.

Combined with FIG. 1, The steps for performing the present invention are as follows:

Step 1, image acquisition under color multiplexed illumination: a high-contrast LCD TFT-LCD or a high-density programmable color LED array is controlled by a computer through a serial port to display a color multiplexed illumination pattern illumination sample, as shown in FIG. 2(b). The illumination pattern is a semi-annular illumination of three colors of red, green and blue with an asymmetric axis difference of 120°, where the NA of the semi-annular illumination is equal to the NA of the objective, and the illumination intensity is distributed sinusoidally.

Assuming that the NA of the objective is expressed as $NA_{obj}$, the illumination function for color multiplexing expressed in polar coordinates is:

$$S_r(\rho,\theta)=\delta(\rho-NA_{obj})\sin(\theta+\theta_r) \; S_g(\rho,\theta)=\delta(\rho-NA_{obj})\sin(\theta+\theta_g) \; S_b(\rho,\theta)=\delta(\rho-NA_{obj})\sin(\theta+\theta_b) \; ( \theta_r+\theta_g-120° , \theta_b=\theta_g+120° )$$

where $S_r(\rho,\theta)$, $S_g(\rho,\theta)$, $S_b(\rho,\theta)$ denotes the illumination functions corresponding to the three wavelengths of red, green, and blue, respectively. $\rho$, $\theta$ denotes the radius and polar angle of the polar coordinate system, respectively, and $\delta(\rho-NA_{obj})$ is the angle of the asymmetry axis of the illumination pattern of the three colors of red, green, and blue, respectively. The shape of the illumination pattern is expressed as a annulus of illumination NA matched with the NA of the objective lens. From this illumination function, it can be seen that the design of the present invention is satisfied as long as the angle of the three wavelength illumination patterns is 120°. A synchronous trigger signal is generated to the color camera while sending the illumination control, and then a color sample image is captured, as shown in FIG. 2(c), noted as $I_c$. The invention uses the optimal illumination scheme combined with color multiplexed illumination to achieve single-shot DPC imaging, which significantly improves the isotropic degree of imaging, while greatly improving its low-frequency imaging contrast and high-frequency resolution.

If the alternating illumination strategy is used, a second color sample image will be acquired by rotating the illumination pattern by 90° in any direction after the above acquisition process is completed, noted as $I_{c,\perp}$. A single shot of color multiplexed illumination pattern is used as pattern 1, which is rotated by 90° in any direction as pattern 2. Two images are acquired using these two alternating illuminations. Phase recovery can be achieved using these two images to obtain a completely isotropic PTF and achieve a completely isotropic imaging resolution.

Figure 2:
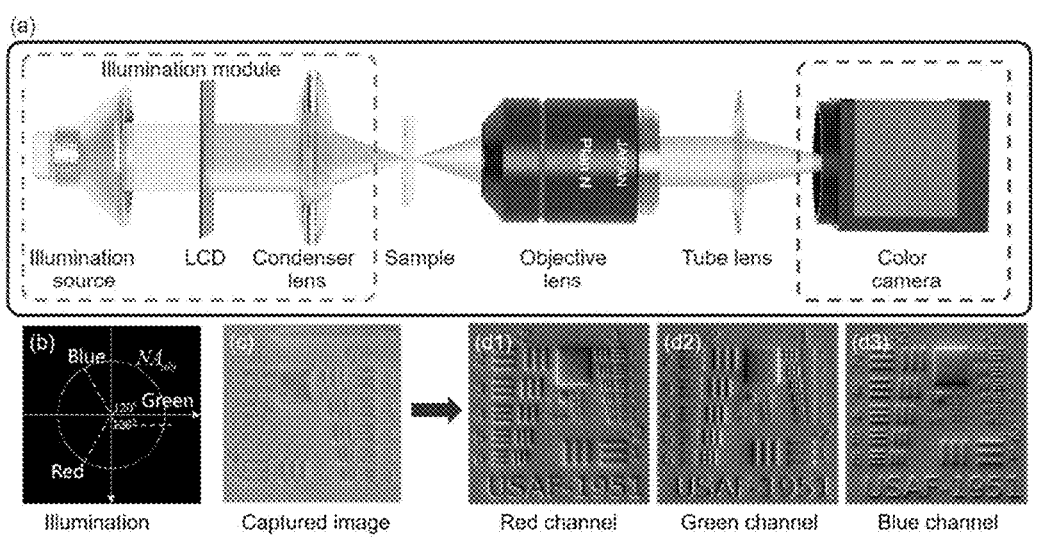
FIG. 2 is a schematic diagram of the system.

Step 2, image color channel separation and correction: The color sample images are separated to three channels and corrected for color leakage to obtain the sample intensity images corresponding to the red, green, and blue channels $I_{r,corr}$, $I_{g,corr}$, $I_{b,corr}$ as shown in FIG. 2 (d1), FIG. 2 (d2), and FIG. 2 (d3).

If the alternating illumination strategy is adopted, the two color sample images are acquired and the channel separation and correction are performed separately to obtain the sample intensity images of red, green and blue channels corresponding to the two images respectively $I_{r,corr}$, $I_{g,corr}$, $I_{b,corr}$, $I_{r,\perp,corr}$, $I_{g,\perp,corr}$, $I_{b,\perp,corr}$.

Since color LCDs or LEDs usually have a wide emission spectrum, and for most color image sensors, the spectral response of different color channels cannot be completely isolated. Therefore, the light of one color in the illumination may leak into other color channels and be detected by other color channels of the camera, which means that the single-channel image of a color sensor is actually a mixture of different channels. In color multiplexed illumination, the illumination light with three channels simultaneously illuminate the sample to acquire a color image, color leakage becomes more apparent due to the overlap of emission spectra (part of the spectral response of green light overlaps spectrally with the blue and red channels). Directly using the image after separating the channels for DPC phase recovery, the color leakage will lead to severe phase estimation errors. To alleviate the phase error due to color leakage, the present invention employs a color leakage correction method that represents the detector signal measured in the color channel as the sum of the light of the desired color and the light of other colors. In other words, the measured signals in the red, green, and blue channels can be written as:

$$\begin{pmatrix} I_r \\ I_g \\ I_b \end{pmatrix} = \begin{pmatrix} R_r^r & R_g^r & R_B^r \\ R_r^g & R_g^g & R_b^g \\ R_r^b & R_g^b & R_b^b \end{pmatrix} \begin{pmatrix} I_{r,corr} \\ I_{g,corr} \\ I_{b,corr} \end{pmatrix}$$

where $I_r$, $I_g$, $I_b$ is the signal intensity of the red, green, and blue channels measured by the camera sensor, i.e., the intensity images of the red, green, and blue channels obtained by direct channel separation. $I_{r,corr}$, $I_{g,corr}$, $I_{b,corr}$ is the light intensity of the red, green, and blue channels incident on the camera sensor, i.e., the intensity of the image that should be brought into phase recovery after correction. The element $R^n_m$ represents the detection response of the m(m =r,g,b) color channel of the camera to LED light of color n(n=r,g,b).

The purpose of the color leakage correction is to obtain the value of each $R^n_m$ so that $I_{r,corr}$, $I_{g,corr}$, $I_{b,corr}$ can be obtained from the image $I_c$ acquired by the camera. The specific correction scheme is to use a single color l(l=r,g,b) LED for illumination without placing the sample, respectively, and use the color camera to acquire the corresponding placement of the color image $I_{c,l}$. This image $I_{c,l}$ can be separated to obtain three images with different channels $I_{l,r}'$, $I_{l,g}'$, $I_{l,b}'$. The mean values of the intensity of the three channels of the image are calculated separately, and the mean value of illumination 1 are used as a standard to normalize the mean values of other two channels, obtaining $R^l_m$(m=r,g,b). Implementing this process for all three channels, and we will get all $R^n_m$ values. Once the acquisition image with the sample is obtained, the color image can be separated to obtain $I_r$, $I_g$, $I_b$. Then, the corrected light intensity image $I_{r,corr}$, $I_{g,corr}$, $I_{b,corr}$ for each wavelength can be obtained according to the following equation:

$$\begin{pmatrix} I_{r,corr} \\ I_{g,corr} \\ I_{b,corr} \end{pmatrix} = \begin{pmatrix} R_r^r & R_g^r & R_b^r \\ R_r^g & R_g^g & R_b^g \\ R_r^b & R_g^b & R_b^b \end{pmatrix}^{-1} \begin{pmatrix} I_r \\ I_g \\ I_b \end{pmatrix}$$

The three images are used to calculate the spectral response matrix of the camera, which can be used to subsequently correct the images and effectively address the phase reconstruction errors caused by color leakage. This spectral response matrix reconfiguration is calculated only once for the same imaging system.

Step 3, DPC image spectrum generation: Fourier transform is performed on the three channels of $I_{r,corr}$, $I_{g,corr}$, $I_{b,corr}$ to obtain the spectrum distribution of the three images. In order to eliminate the influence of the background term, the value at zero frequency of the three spectrum is set as 0 to obtain the spectrum distribution of the DPC image of the sample under three channels, they are expressed as $\widetilde{I_{r,corr}}$, $\widetilde{I_{g,corr}}$, $\widetilde{I_{b,corr}}$.

If the alternating illumination strategy is used, the single channel sample intensity image $I_{r,corr}$, $I_{g,corr}$, $I_{b,corr}$, $\widetilde{I_{r,corr}}$, $\widetilde{I_{g,corr}}$, $\widetilde{I_{b,corr}}$ corresponding to the two acquired images will be solved for their spectrum separately and the zero frequency of the spectrum will be removed for the elimination of the background term.

Step 4, PTF calculation: Based on the weak phase approximation condition, the PTF $PTF_r(\rho,\theta)$, $PTF_g(\rho,\theta)$, $PTF_b(\rho,\theta)$ corresponding to different wavelengths are calculated according to the parameters of the illumination function and the objective lens.

Figure 3:
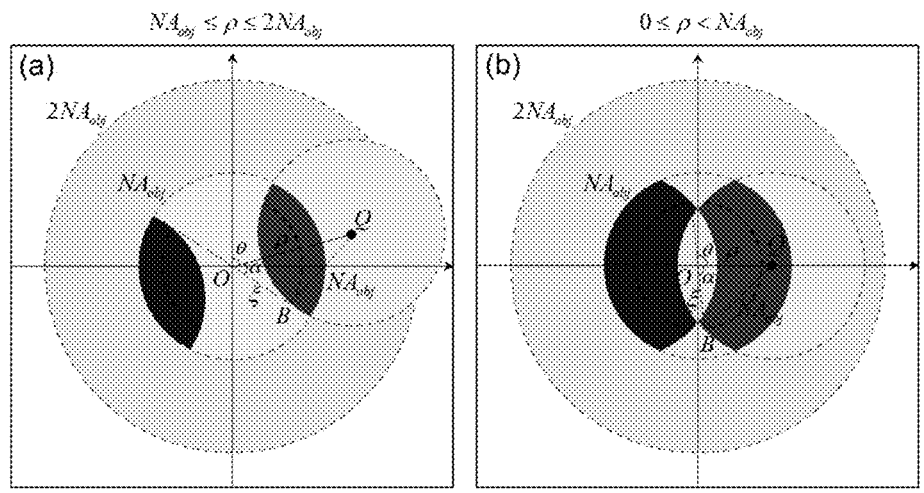
FIG. 3 is a model schematic diagram of the color multiplexed illumination source in polar coordinates.

If the alternating illumination strategy is used, the PTFs corresponding to both illumination patterns need to be solved $PTF_r(\rho,\theta)$, $PTF_g(\rho,\theta)$, $PTF_b(\rho,\theta)$, $PTF_{r,\perp}(\rho,\theta)$, $PTF_{g,\perp}(\rho,\theta)$, $PTF_{b,\perp}(\rho,\theta)$ As shown in FIG. 3, for an arbitrary illumination and aperture function, the transfer response of any point Q of the PTF can be obtained by solving for the overlapping regions of the objective pupil function and the off-axis illumination aperture. This is because illumination falling in these regions ensures that point Q is at $P(u+u_j)=1$ or Q is at $P(u-u_j)=1$. It is worth noting, however, that the two regions corresponding to $P(u+u_j)=1$ and $P(u-u_j)=1$ will cancel each other out when point Q is illuminated at an angle close to the central axis of the objective. Therefore, for different positions of Q, the integration interval for calculating the PTF should be divided as shown in FIG. 3(a) and FIG. 3(b). Taking the illumination in a single direction as an example for the solution of the PTF, the expression for the solution of the phase transfer can be obtained as:

$$PTF(\rho, \theta) = \begin{cases} \dfrac{2\int_{\rho-NA_{obj}}^{NA_{odj}} \int_{\theta-\alpha}^{\theta+\alpha} S(\xi, \varepsilon)d\xi d\varepsilon}{\int_0^{NA_{obj}} \int_0^{2\pi} |S(\xi, \varepsilon)|d\xi d\varepsilon} & NA_{obj} \le \rho \le 2NA_{obj} \\ \dfrac{2\int_{NA_{obj}-\rho}^{NA_{obj}} \int_{\theta-\alpha}^{\theta+\alpha} S(\xi, \varepsilon)d\xi d\varepsilon}{\int_0^{NA_{obj}} \int_0^{2\pi} |S(\xi, \varepsilon)|d\xi d\varepsilon} & 0 \le \rho < NA_{obj} \end{cases}$$

According to this calculated expression, the illumination function is brought into the calculation of red, green, blue three wavelengths corresponding to the transfer function, to obtain:

$PTF_r(\rho,\theta)=\sin(\alpha_r)\sin(\theta+\theta_r)$ $PTF_g(\rho,\theta)=\sin(\alpha_g)\sin(\theta+\theta_g)$ $PTF_b(\rho,\theta)=\sin(\alpha_b)\sin(\theta+\theta_b)$ ( $\theta_r=\theta_g-120°$, $\theta_b=\theta_g+120°$ )

Here $\alpha_r$, $\alpha_g$, $\alpha_b$, is determined by the $NA_{obj}$ of the objective and the illumination wavelength $\lambda_r$, $\lambda_g$, $\lambda_b$ which can be obtained by solving for the following equation:

$$\cos(\alpha_r) = \frac{\rho\lambda_r}{2NA_{obj}}, \cos(\alpha_g) = \frac{\rho\lambda_g}{2NA_{obj}}, \cos(\alpha_b) = \frac{\rho\lambda_b}{2NA_{obj}}$$

Step 5, sample quantitative phase recovery: according to $PTF_r(\rho,\theta)$, $PTF_g(\rho,\theta)$, $PTF_b(\rho,\theta)$ of different wavelengths and the DPC image spectrum $\widetilde{I_{r,corr}}$, $\widetilde{I_{g,corr}}$, $\widetilde{I_{b,corr}}$, the Tikhonov criterion is used for the inverse convolution calculation to obtain the high-resolution spectrum of the sample phase. Then, the inverse Fourier transform is performed on this high-resolution spectrum to obtain the quantitative phase distribution $\phi$ of the sample.

$$\phi = F^{-1}\left\{ \frac{\sum_k \left[ PTF_k^*(\rho, \theta) \cdot \widetilde{I_{k,corr}} \cdot \frac{\lambda_k}{\lambda} \right]}{\sum_k |PTF_k^*(\rho, \theta)|^2 + \beta} \right\}$$

Here k denotes different wavelength channels, red, green, blue. $PTF^*_k(\rho,\theta)$ denotes the conjugate distribution of $PTF_k(\rho,\theta)$. $\lambda_k/\lambda$ denotes the wavelength normalization coefficient. Because the phase and wavelength are inversely proportional, so in the color multiplexed illumination, it is necessary to normalize the wavelength to get a uniform phase distribution, here $\lambda$ denotes the normalized wavelength, which can be chosen as any wavelength. The blue illumination wavelength is chosen as the normalized wavelength. $\beta$ is the normalization parameter, generally choose a smaller value, such as 0.01.

If the alternating illumination strategy is used, the sample image spectrum and transfer function corresponding to the two illumination patterns should be brought into the deconvolution calculation, then the quantitative phase distribution $\phi$ of the sample is solved by:

$$\phi = F^{-1}\left\{ \frac{\sum_k \left[ PTF_k^*(\rho, \theta) \cdot \widetilde{I_{k,corr}} \cdot \frac{\lambda_k}{\lambda} + PTF_{k,\perp}^*(\rho, \theta) \cdot \widetilde{I_{k,corr,\perp}} \cdot \frac{\lambda_k}{\lambda} \right]}{\sum_k \left( |PTF_k^*(\rho, \theta)|^2 + |PTF_{k,\perp}^*(\rho, \theta)|^2 \right) + \beta} \right\}$$

Figure 4:
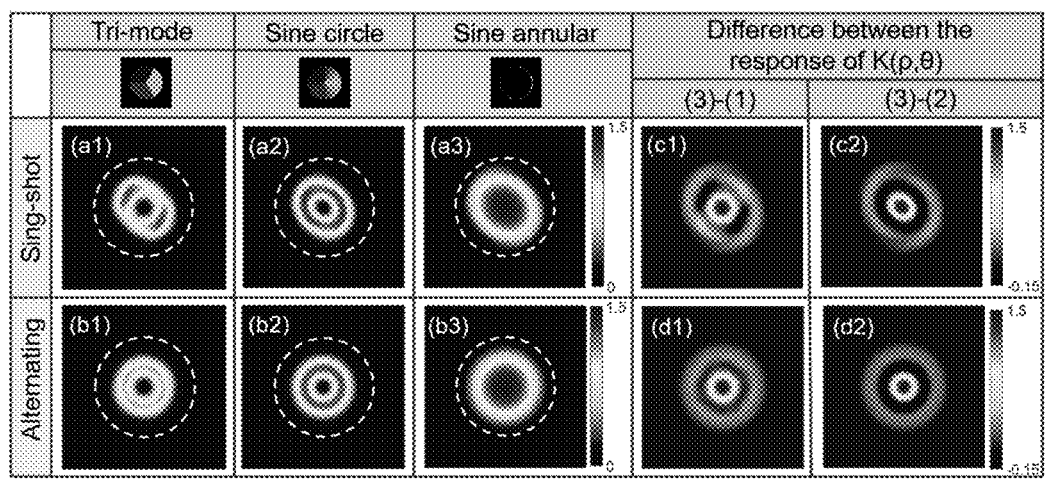
FIG. 4 is a comparison of the imaging performance under single-shot DPC quantitative phase microscopy imaging with the color multiplexed illumination of the present invention and the existing uniform circular single-shot DPC imaging illumination.

To compare the imaging performance of the present invention, FIG. 4 shows the PTFs under the existing single-shot DPC imaging illumination scheme and the present invention, including uniform circular, sinusoidal circular, and sinusoidal toroidal, and the asymmetric axis angle of all three illuminations is 120°. Simulations were performed using the same objective and illumination parameters to obtain the multi-axis synthetic PTF corresponding to each illumination pattern, as shown in FIG. 4(a1), FIG. 4(a2), and FIG. 4(a3). Comparing these three PTFs, it can be found that under uniform circular illumination, the PTF has poor transfer responses, especially at the center low frequency and high frequency near $2NA_{obj}$. With such an illumination, the phase contrast will be poor, resulting to a loss of imaging resolution Compared with uniform circular illumination, the isotropy of the PTF is greatly improved under sinusoidal circular illumination, but the low and high frequency responses of the transfer function are still very weak. The sinusoidal circular illumination of the present invention greatly improves the isotropy of the phase transfer response, while its transfer response is significantly enhanced in the whole incoherent imaging range. FIG. 4(c1) and FIG. 4(c2) show the differences in the PTF responses of FIG. 4(a3) and FIG. 4(a1), FIG. 4(a3) and FIG. 4(a2), respectively, and the enhancement of the PTF by the illumination scheme of the present invention can be clearly observed. In addition, the phase transfer response of the alternating illumination strategy was further compared and the results are shown in FIG. 4(b1), FIG. 4(b2), and FIG. 4(b3). Comparing these three PTFs, it can be found that the illumination scheme of the present invention can obtain a completely isotropic PTF under the alternating illumination strategy. FIG. 4(d1) and FIG. 4(d2) show the difference in the response of the PTF of FIG. 4(b3) and FIG. 4(b1), FIG. 4(b3) and FIG. 4(b2). It can be seen that the alternating scheme of the present invention significantly enhances the response of the PTF.

Figure 5:
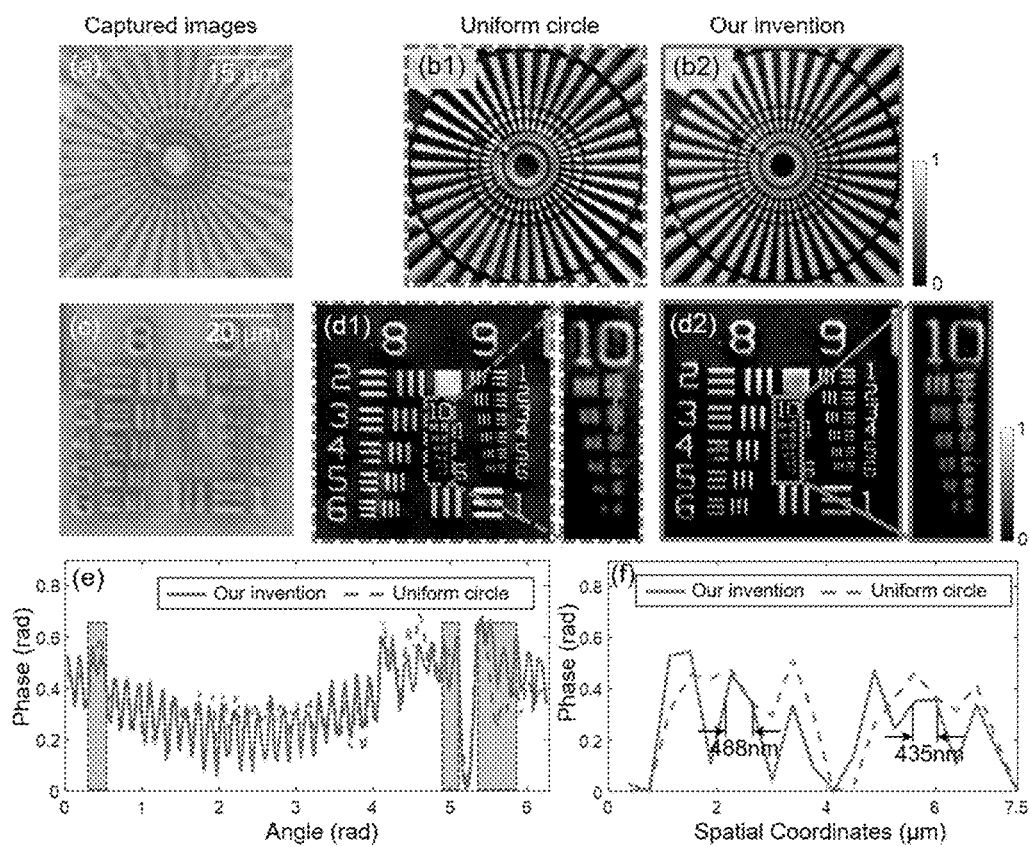
FIG. 5 is a plot of the final imaging results of a standard USAF resolution target using the present invention and a semicircular single-shot DPC QPI method under a 10x objective.

In order to verify the high resolution, high stability, and high contrast of the single-shot DPC QPI results based on color multiplexed illumination of the present invention, a comparison experiment was conducted using a standard USAF phase resolution target as a sample with uniform circular illumination and the method of the present invention. The experimental results are shown in FIG. 5. FIG. 5 (a) and FIG. 5 (c) show the images acquired by the color multiplexed illumination of the present invention. The quantitative phase results obtained under uniform circular illumination are shown in FIG. 5 (b1) and FIG. 5(d1), and the quantitative phase results of the present invention are shown in FIG. 5(b2) and FIG. 5(d2). Comparing FIG. 5(b1) with FIG. 5(b2) and FIG. 5(d1) with FIG. 5(d2), it can be found that better robustness, better contrast and higher resolution phase results are obtained under color multiplexed illumination of the present invention. The phase values at the highest resolution are further extracted and plotted to quantitatively compare the imaging performance of these two illuminations. FIG. 5(e) shows the distribution of the curves at the highest resolution in FIG. 5(b1) and FIG. 5(b2). It can be found that the reconstructed phase of the present invention can be clearly distinguished in all directions, while it cannot be distinguished at partial resolution under uniform circular illumination. FIG. 5(f) shows the quantitative phase distribution on the highest resolution in FIG. 5(d1) and FIG. 5(d2), and the comparison shows that the present invention achieves the theoretical highest resolution of 435nm, while this resolution cannot be recovered under uniform circular illumination.

Figure 6:
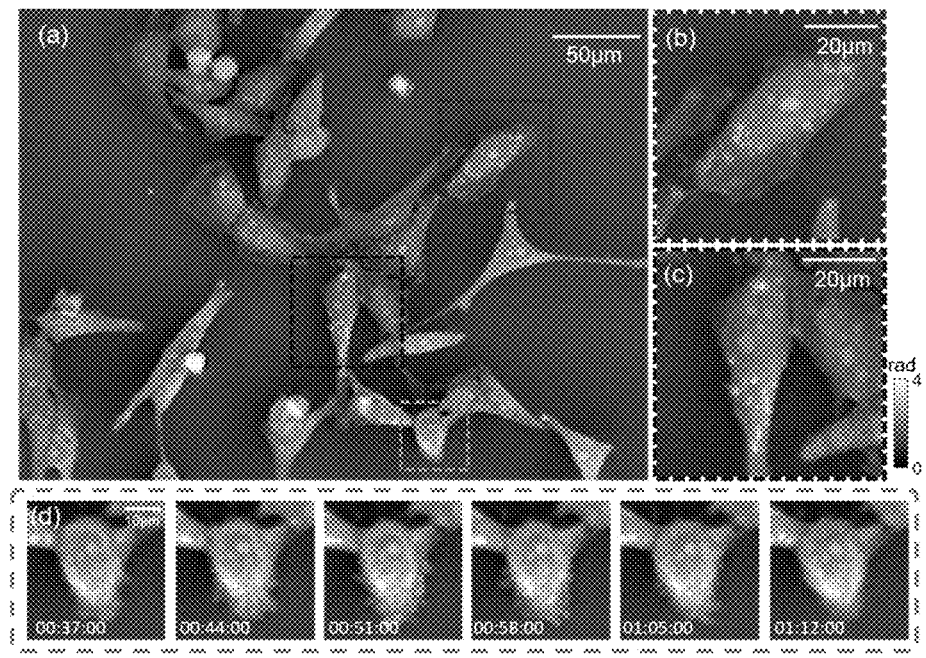
FIG. 6 shows the final imaging results for in vitro unstained cervical cancer (Hela) live cells using color multiplexed single-shot DPC QPI under a 10x objective.

In order to verify the real-time dynamic imaging performance of the single-shot DPC QPI based on color multiplexed illumination of the present invention, a living cell dynamic experiment was performed on cervical cancer (Hela) cells cultured in vitro for 1.65h. The cells were placed in a suitable culture environment, and the reconstructed experimental phase results are shown in FIG. 6. FIG. 6(a) shows the reconstructed phase results in full field of view, and two regions of interest are selected for magnification, as shown in FIG. 6(b) and FIG. 6(c). It can be seen that cellular and subcellular information such as nuclei and vesicles can be clearly observed, which indicates that the present invention achieves real-time dynamic and high-resolution imaging. Further showing the dynamic cell results at different moments in FIG. 6(d), it can be seen that the phase of the cells at different moments is clearly reproduced without any motion artifacts or trailing phenomenon.

The invention claimed is:

1. A single-shot differential phase contract (DPC) quantitative phase imaging (QPI) method based on color multiplexed illumination, comprising the steps of:

step 1, displaying color multiplexed illumination pattern irradiated samples by a computer-controlled high-contrast LCD TFT-LCD or high-density programmable LED array, while sending illumination control to generate a synchronous trigger signal to a color camera to acquire a color sample image, recorded as $I_c$;

step 2, separting the color sample image $I_c$ in a single channel and performing a color leakage correction to obtain sample intensity images $I_{r,corr}$, $I_{g,corr}$, $I_{b,corr}$ corresponding to red, green and blue three channels;

step 3, perfomring a fourier transform on the sample intensity images $I_{r,corr}$, $I_{g,corr}$, $I_{b,corr}$ to obtain spectral distribution of the sample intensity images, including setting azero frequency of three spectra is set to 0, to eliminate an effect of a background term, to obtain a DPC image spectral distribution of the sample intensity images, expressed as $\widetilde{I_{r,corr}}$, $\widetilde{I_{g,corr}}$, $\widetilde{I_{b,corr}}$;

step 4, based on weak phase approximation condition, calculating phase transfer function (PTF) including $PTF_r(\rho,\theta)$, $PTF_g(\rho,\theta)$, $PTF_b(\rho,\theta)$, corresponding to different wavelengths according to parameters of an illumination function and an objective lens;

step 5, according to the PTF including $PTF_r(\rho,\theta)$, $PTF_g(\rho,\theta)$, $PTF_b(\rho,\theta)$, at different wavelengths and a DPC image spectral distribution $\widetilde{I_{r,corr}}$, $\widetilde{I_{g,corr}}$, $\widetilde{I_{b,corr}}$ of the sample intensity images, using a Tikhonov criterion for an inverse convolution calculation to obtain a high-resolution spectrum of a sample phase, and performing an inverse Fourier transform on the high-resolution spectrum to obtain a quantitative phase distribution $\phi$ of the sample by the following equation:

$$\phi = F^{-1}\left\{\frac{\sum_k\left[PTF_k^*(\rho,\theta)\cdot \widetilde{I_{k,corr}}\cdot\frac{\lambda_k}{\lambda}\right]}{\sum_k|PTF_k^*(\rho,\theta)|^2 + \beta}\right\}$$

where k denotes different wavelength channels, red, green, blue; $PTF^*_k(\rho,\theta)$ denotes a conjugate distribution of $PTF_k(\rho,\theta)$; $\lambda_k$ /λ denotes a wavelength normalization coefficient, λ denotes a normalized wavelength, β is a normalization parameter.

2. A single-shot differential phase contract (DPC) quantitative phase imaging (QPI) method based on color multiplexed illumination, comprising the steps of:

step 1, displaying color multiplexed illumination pattern irradiated samples by a computer-controlled high-contrast liquid crystal display TFT-LCD or high-density programmable LED array while sending illumination control to generate a synchronous trigger signal to a color camera to capture a color sample image, recorded as $I_c$; and using an alternating illumination strategyto rotate the illumination pattern 90° in any direction to illuminate the sample to acquire a second color sample image, denoted as $I_{c,\perp}$;

step 2, separating and correcting the two captured color sample images $I_c$, $I_{c,\perp}$, respectively, to obtain two images corresponding to each of red, green and blue channels of sample intensity image $I_{r,corr}$, $I_{g,corr}$, $I_{b,corr}$, $I_{r,\perp,corr}$, $I_{g,\perp,corr}$, $I_{b,\perp,corr}$; step 3, solving the sample intensity images $I_{r,corr}$, $I_{g,corr}$, $I_{b,corr}$, $I_{r,\perp,corr}$, $I_{g,\perp,corr}$, $I_{b,\perp,corr}$ of a single channel corresponding to the two acquired images for a spectrum and remvoing zero frequency of the spectrum so as to eliminate background term;

step 4, solving for phase transfer function (PTF) including $PTF_r(\rho,\theta)$, $PTF_g(\rho,\theta)$, $PTF_b(\rho,\theta)$, $PTF_{r,\perp}(\rho,\theta)$, $PTF_{g,\perp}(\rho,\theta)$, $PTF_{b,\perp}(\rho,\theta)$, corresponding to the two illumination patterns;

step 5, bringthe two illumination patterns corresponding to sample image spectrum and transfer function into a deconvolution calculation, and then the solving a quantitative phase distribution $\phi$ of the sample by the formula:

$$\phi = F^{-1}\left\{\frac{\sum_k\left[PTF_k^*(\rho,\theta)\cdot \widetilde{I_{k,corr}}\cdot\frac{\lambda_k}{\lambda} + PTF_{k,\perp}^*(\rho,\theta)\cdot \widetilde{I_{k,\perp,corr}}\cdot\frac{\lambda_k}{\lambda}\right]}{\sum_k(|PTF_k^*(\rho,\theta)|^2 + |PTF_{k,\perp}^*(\rho,\theta)|^2) + \beta}\right\}$$

3. The method according to claim 1, wherein in the step 1, the illumination pattern is a semi-annular illumination of three colors of red r, green g, and blue b with an asymmetric axis difference of 120°, wherein a numerical aperture (NA) of the semi-annular illumination is equal to a NA of the objective lens, and an illumination intensity is distributed sinusoidally, assuming that, the NA of the objective lens is expressed as $NA_{obj}$; an illumination function for color multiplexing is expressed in a polar coordinate system as:

$S_r(\rho,\theta)=\delta(\rho-NA_{obj})\sin(\theta+\theta_r)$ $S_g(\rho,\theta)=\delta(\rho-NA_{obj})\sin(\theta+\theta_g)$ $S_b(\rho,\theta)=\delta(\rho-NA_{obj})\sin(\theta+\theta_b)$ ( $\theta_r+\theta_g-120°$, $\theta_b=\theta_g+120°$ )

where $S_r(\rho,\theta)$, $S_g(\rho,\theta)$, $S_b(\rho,\theta)$ denotes illumination functions corresponding to the three wavelengths of red r, green g. and blue b, respectively, ρ, θ denotes radius and polar angle of the polar coordinate system, respectively, $\theta_r$, $\theta_g$, $\theta_b$, are angles of an asymmetry axis of the illumination patterns of red r, green g, and blue b, respectively, and $\delta(\rho-NA_{obj})$ denotes a shape of the illumination pattern being an annulus where the NA of the illumination coincides with the NA of the objective lens.

4. The method according to claim 1, wherein in the step 2, a color leakage correction method is used to represent a detector signal measured in a color channel as a sum of light of a desired color and light of other colors, wherein the measured signal in the red r, green g, and blue b channels is expressed as:

$$\begin{pmatrix} I_r \\ I_g \\ I_b \end{pmatrix} = \begin{pmatrix} R_r^r & R_g^r & R_b^r \\ R_r^g & R_g^g & R_b^g \\ R_r^b & R_g^b & R_b^b \end{pmatrix} \begin{pmatrix} I_{r,corr} \\ I_{g,corr} \\ I_{b,corr} \end{pmatrix}$$

where $I_r$, $I_g$, $I_b$ is signal intensity of the red, green, and blue channels measured by a camera sensor, which are intensity images of the red, green, and blue channels obtained by direct channel separation; $I_{r,corr}$, $I_{g,corr}$, $I_{b,corr}$ is light intensity of the red, green, and blue channels incident on the camera sensor; $R^n_m$ represents a detection response of m(m=r,g,b) color channel of the camera to LED light of color n(n=r,g,h);

wherein the step 2 further comprises the steps of:

using a single color l(l=r,g,b) LED for illumination without placing the sample;

using the color camera to acquire corresponding placement of a color image $I_{c,l}'$, obtaining channel separation of the image $I_{c,l}'$ for the three channels of images $I_{l,r}'$, $I_{l,g}'$, $I_{l,b}'$;

calculating mean values of intensity of the three channels of the image separately, and using the mean values of the images corresponding to a color of an illumination light I as a standard for the mean values of the other two color channels normalized to obtain three values, which are $R^l_m$(m=r,g,b); p1 perfomring the step of calculating for all three channels to obtain all $R^n_m$ values; and p1 once a camera acquisition image with the sample is obtained, separating the channels to obtain $I_r$, $I_g$, $I_b$, and obtaining corrected light intensity image $I_{r,corr}$, $I_{g,corr}$, $I_{b,corr}$ for each wavelength according to the following equation:

$$\begin{pmatrix} I_{r,corr} \\ I_{g,corr} \\ I_{b,corr} \end{pmatrix} = \begin{pmatrix} R_r^r & R_g^r & R_b^r \\ R_r^g & R_g^g & R_b^g \\ R_r^b & R_g^b & R_b^b \end{pmatrix}^{-1} \begin{pmatrix} I_r \\ I_g \\ I_b \end{pmatrix}.$$

5. The method according to claim 2, wherein in the step 1, the illumination pattern is a semi-annular illumination of three colors of red r, green g, and blue b with an asymmetric axis difference of 120°, wherein the a numerical aperture (NA) of the semi-annular illumination is equal to a NA of the objective lens, and an illumination intensity is distributed sinusoidally, assuming that the NA of the objective lens is expressed as $NA_{obj}$ ; an illumination function for color multiplexing is expressed in a polar coordinate system as:

$$S_r(\rho,\theta)=\delta(\rho-NA_{obj})\sin(\theta+\theta_r) \; S_g(\rho,\theta)=\delta(\rho-NA_{obj}) \\ \sin(\theta+\theta_g) \; S_b(\rho,\theta)=\delta(\rho-NA_{obj})\sin(\theta+\theta_b) \; ( \\ \theta_y+\theta_g-120° \, , \, \theta_b=\theta_g+120° \,)$$

where $S_r(\rho,\theta)$, $S_g(\rho,\theta)$, $S_b(\rho,\theta)$ denotes illumination functions corresponding to the three wavelengths of red r, green g. and blue b, respectively, $\rho$, $\theta$ denotes radius and polar angle of the polar coordinate system, respectively, $\theta_r,\theta_g,\theta_b$ are angles of an asymmetry axis of the illumination patterns of red r, green g, and blue b, respectively, and $\delta(\rho-NA_{obj})$ denotes a shape of the illumination pattern being an annulus where the NA of the illumination coincides with the NA of the objective lens.

6. The method according to claim 2, wherein in the step 2, a color leakage correction method is used to represent a detector signal measured in a color channel as a sum of light of a desired color and light of other colors, wherein the measured signal in the red r, green g, and blue b channels is expressed as:

$$\begin{pmatrix} I_r \\ I_g \\ I_b \end{pmatrix} = \begin{pmatrix} R_r^r & R_g^r & R_b^r \\ R_r^g & R_g^g & R_b^g \\ R_r^b & R_g^b & R_b^b \end{pmatrix} \begin{pmatrix} I_{r,corr} \\ I_{g,corr} \\ I_{b,corr} \end{pmatrix}$$

where $I_r$, $I_g$, $I_b$ is signal intensity of the red, green, and blue channels measured by a camera sensor, which are intensity images of the red, green, and blue channels obtained by direct channel separation; $I_{r,corr}$, $I_{g,corr}$, $I_{b,corr}$ is the light intensity of the red, green, and blue channels incident on the camera sensor, i $R^n_m$ represents a detection response of the m(m=r g, b)color channel of the camera to LED light of color n(n =r, g, b) ;

wherein the step 2 further comprises the steps of:

using a single color l(l=r,g,b) LED for illumination without placing the sample;

using the color camera to acquire corresponding placement of a color image $I_{c,l}'$;

obtaing channel separation of the image $I_{c,l}'$ for the three channels of images $I_{l,r}'$, $I_{l,g}'$, $I_{l,b}'$;

calculating mean values of intensity of the three channels of the image separately, and using the mean values of the images corresponding to a color of an illumination light l as a standard for the mean values of the other two color channels normalized to obtain three values, which are $R^l_m$(m=r,g,b);

performing the step of calculating for all three channels to obtain all $R^n_m$ values; and once a camera acquisition image with the sample is obtained, separating the channels to obtain $I_r$, $I_g$, $I_b$ and obtaining corrected light intensity image $I_{r,corr}$, $I_{g,corr}$, $I_{b,corr}$ for each wavelength according to the following equation:

$$\begin{pmatrix} I_{r,corr} \\ I_{g,corr} \\ I_{b,corr} \end{pmatrix} = \begin{pmatrix} R_r^r & R_g^r & R_b^r \\ R_r^g & R_g^g & R_b^g \\ R_r^b & R_g^b & R_b^b \end{pmatrix}^{-1} \begin{pmatrix} I_r \\ I_g \\ I_b \end{pmatrix}.$$

\* \* \* \* \*